United States Patent
Marschall et al.

(10) Patent No.: US 8,843,436 B2
(45) Date of Patent: Sep. 23, 2014

(54) SYSTEMS AND METHODS FOR PERFORMING DIRECT REPORTING ACCESS TO TRANSACTION DATABASES

(75) Inventors: Franz Marschall, Walldorf (DE); Stefan Unnebrink, Walldorf (DE)

(73) Assignee: SAP AG, Walldorf (DE)

( * ) Notice: Subject to any disclaimer, the term of this patent is extended or adjusted under 35 U.S.C. 154(b) by 684 days.

(21) Appl. No.: 12/705,184

(22) Filed: Feb. 12, 2010

(65) Prior Publication Data

US 2011/0202497 A1  Aug. 18, 2011

(51) Int. Cl.
*G06F 7/00* (2006.01)
*G06F 17/00* (2006.01)
*G06F 17/30* (2006.01)

(52) U.S. Cl.
CPC ............................. *G06F 17/30306* (2013.01)
USPC ........................... 707/602; 707/608; 707/609

(58) Field of Classification Search
CPC .......... G06F 17/30563; G06F 17/3048; G06F 17/30554; G06F 17/3056; G06F 17/30899; G06F 17/30592; G06F 17/3089; G06F 17/30395; G06F 17/30398; G06F 17/30557; G06F 17/30306
See application file for complete search history.

(56) References Cited

U.S. PATENT DOCUMENTS

| | | | |
|---|---|---|---|
| 6,741,982 B2 * | 5/2004 | Soderstrom et al. | 1/1 |
| 6,820,135 B1 * | 11/2004 | Dingman et al. | 709/246 |
| 6,856,992 B2 * | 2/2005 | Britton et al. | 707/689 |
| 7,174,342 B1 * | 2/2007 | Scheurich et al. | 1/1 |
| 7,426,059 B2 * | 9/2008 | Broda et al. | 358/1.3 |
| 7,593,951 B2 | 9/2009 | Biedenstein et al. | |
| 2008/0154994 A1 * | 6/2008 | Fischer et al. | 707/206 |
| 2008/0256039 A1 * | 10/2008 | Chang et al. | 707/3 |
| 2008/0270450 A1 * | 10/2008 | Veitch et al. | 707/102 |

OTHER PUBLICATIONS

John Scarne "Scarne's Encyclopedia of Card Games," HarperCollins, chap. 2-3, 1973.

* cited by examiner

*Primary Examiner* — Susan Chen
(74) *Attorney, Agent, or Firm* — Fountainhead Law Group PC (57) ABSTRACT

In one embodiment, the present invention includes a computer-implemented method comprising receiving a query and generating first and second requests. The first request is sent to an analytic data store and includes a data transfer indicator representing a time period when the data record was received in the analytic data store. The second request is sent to a transactional model proxy and includes a monotonically changing value, such as a timestamp. The transactional model proxy reads data from a transactional data store based on the value in the request. Data from the analytic and transactional data stores may be aggregated and returned in response to the query.

20 Claims, 8 Drawing Sheets

| Document No | Document item | Timestamp | ... | Order Quantity | Unit of measure | ... |
|---|---|---|---|---|---|---|
| 100001 | 10 | 10-Jan-2009 12:00:00 | ... | 200 | Pieces | ... |
| 100001 | 20 | 10-Jan-2009 12:00:00 | ... | 150 | Pieces | ... |
| 100002 | 10 | 10-Jan-2009 12:01:00 | ... | 250 | KG | ... |
| ... | ... | ... | ... | ... | ... | ... |

Table 1

| Document No | Document item | Timestamp | ... | Order Quantity | Unit of measure | ... |
|---|---|---|---|---|---|---|
| 100001 | 10 | 10-Jan-2009 12:00:00 | ... | 200 | Pieces | ... |
| 100001 | 20 | 10-Jan-2009 12:00:00 | ... | 150 | Pieces | ... |
| 100002 | 10 | 10-Jan-2009 12:01:00 | ... | 250 | KG | ... |
| ... | ... | ... | ... | ... | ... | ... |
| 100001 | 10 | 11-Jan-2009 11:00:00 | ... | -20 | Pieces | ... |
| 100001 | 20 | 11-Jan-2009 11:00:00 | ... | +15 | Pieces | ... |

Table 2

*Fig. 3*

| Request | Document No | Document item | ... | Order Quantity | Unit of measure | ... |
|---|---|---|---|---|---|---|
| 1 | 100001 | 10 | ... | 200 | Pieces | ... |
| 1 | 100001 | 20 | ... | 150 | Pieces | ... |
| 1 | 100002 | 10 | | 250 | KG | |
| 1 | ... | ... | ... | ... | ... | ... |

Table 3

| Request | Timestamp up to |
|---|---|
| 1 | 10-Jan-2009 12:10:00 |

Table 4

| Document No | Document item | ... | Order Quantity | Unit of measure | ... |
|---|---|---|---|---|---|
| 100001 | 10 | ... | 185 | Pieces | ... |
| 100001 | 20 | ... | 165 | Pieces | ... |
| 100002 | 10 | | 250 | KG | |
| ... | ... | ... | ... | ... | ... |

Table 5

*Fig. 4*

| Request | Document No | Document item | ... | Order Quantity | Unit of measure | ... |
|---|---|---|---|---|---|---|
| 1 | 100001 | 10 | ... | 200 | Pieces | ... |
| 1 | 100001 | 20 | ... | 150 | Pieces | ... |
| 1 | 100002 | 10 | | 250 | KG | |
| 1 | ... | ... | ... | ... | ... | ... |
| | | | | | | |
| 2 | 100001 | 10 | | -20 | Pieces | |
| 2 | 100001 | 20 | | +15 | Pieces | |

Table 6

| Request | Timestamp up to |
|---|---|
| 1 | 10-Jan-2009 12:10:00 |
| 2 | 11-Jan-2009 11:00:00 |

Table 7

| Document No | Document item | Timestamp | ... | Order Quantity | Unit of measure | ... |
|---|---|---|---|---|---|---|
| 100001 | 10 | 11-Jan-2009 11:00:00 | ... | 180 | Pieces | ... |
| 100001 | 20 | 11-Jan-2009 11:00:00 | ... | 165 | Pieces | ... |
| 100002 | 10 | 10-Jan-2009 12:01:00 | ... | 250 | KG | ... |
| ... | ... | ... | ... | ... | ... | |

Table 6

SYSTEMS AND METHODS FOR PERFORMING DIRECT REPORTING ACCESS TO TRANSACTION DATABASES

BACKGROUND

The present invention relates to computing, and in particular, to systems and methods for performing direct reporting access to transactional data stores.

The storage of information by a machine, such as a computer, can be tailored for operational efficiency and effectiveness in different contexts. Such tailoring is often achieved by using different data models in the different contexts. A data model is the logical structure of a data store, and can include the physical storage parameters needed to implement a design. For example, contexts for which data models can be tailored include data analysis or data transactions. For instance, a transactional data store may be optimized for high speed processing of transactions on individual data records. Accordingly, transactional data stores may use transactional data models that are generally tailored to facilitate efficient modification of the stored data. As another example, an analytic data store, such as a data warehouse, may be optimized for reporting, where vast quantities of data relating to an organization (or unit thereof) may be stored over time to analyze the performance of the organization. Accordingly, analytic data stores may use reporting data models that are generally tailored to facilitate analysis and reporting of the stored data.

Transactional data models generally ensure that data modifications can be made quickly by using relatively small data storage structures that can be modified independently of other transactional data structures. A relatively small data storage structure may be one that is comparable in size to the largest common change transaction. A change transaction is a transaction in which the stored data content is added, deleted, or otherwise changed, for example. A transactional data model can thus include individual data records that are comparable in size to common changes to content. For example, a transactional data model can include data records that correspond to individual sales orders in a business, individual customers, and/or individual products.

As mentioned above, reporting data models are generally tailored to facilitate analysis and/or reporting of stored data. In this regard, reporting data models generally ensure that large amounts of stored data can be accessed quickly and easily by using relatively large data storage structures. Also, reporting data models can be structured so that portions of the data model only include numeric data. Thus, an exhaustive or near-exhaustive search can thus be performed rapidly on this numeric data. A reporting data model can be several hundred or more times the size of common change transactions. For example, a reporting data model can be a relational data store such as a common warehouse metamodel (CWM) star schema that includes objects which store data regarding several thousand, million, or billion sales orders, customers, and/or products.

One problem associated with the use of both transactional data models and reporting data models is latency. It is generally desirable to have the most up to date data in an analytic data store so the reports are as accurate as possible. However, because the data in an analytic data store originates in a transactional data store, there is typically latency between the time a transaction actually occurs and the time the data changes are transferred to the analytic data store. This latency may result in reporting inaccuracies when queries are run against the analytic data store. Consequently, there exists a need for improved systems and methods for accessing data in transactional and analytic data stores. The present invention addresses this problem, and others, by providing systems and methods for performing direct reporting access to transactional data stores.

SUMMARY

Embodiments of the present invention include systems and methods for performing direct reporting access to transactional data stores. In one embodiment, the present invention includes a computer-implemented method comprising receiving a query in a controller, wherein the controller stores information about the transfer of data between a transactional data store and an analytic data store, wherein the transactional data store stores data as a plurality of data records using a transactional data model, each data record comprising a plurality of data elements, and wherein each data record comprises a data element having a first monotonically changing value, wherein the analytic data store receives a plurality of data records from the transactional data store at discrete time periods and stores the received plurality of data records using the analytic data model, and wherein each data record in the analytic data model is associated with a data transfer indicator representing a time period when the data record was received in the analytic data store, and wherein the information stored in the controller associates a data transfer indicator value with a second monotonically changing value. The method further includes generating, by the controller, a first request for data and a second request for data based on the query, the first request comprising the data transfer indicator value and the second request comprising the second monotonically changing value associated with the data transfer indicator value, sending the first request to an analytic data store, wherein the first request retrieves data records from the analytic data store based on the data transfer indicator value, and sending the second request to a transactional model proxy, wherein the transactional model proxy receives the second request and reads data directly from the transactional data store, and wherein the second request causes the transactional model proxy to read data records from the transactional data store based on the second monotonically changing value.

In one embodiment, the first monotonically changing value is a timestamp indicating a time when the data record was changed in the transactional data store and wherein the second monotonically changing value is a timestamp specifying a particular time period that one or more data records associated with a particular data transfer indicator were received in the analytic data store.

In one embodiment, the first request retrieves data records from the analytic data store having said data transfer indicator value in a first range.

In one embodiment, the data transfer indicator value of the retrieved data records is a number less than or equal to the data transfer indicator value in the first request.

In one embodiment, the method further comprises receiving, in the controller, first data from the analytic data store in response to the first request and second data from the transactional data store in response to the second request, aggregating the first data and the second data, and returning the aggregated data in response to the query.

In one embodiment, the data transfer indicator specifies one of a plurality of batch loadings of data from the transactional data store to the analytic data store.

In one embodiment, the second request retrieves data records from the transactional data store having said first monotonically changing value greater than said second monotonically changing value.

In one embodiment, the transactional model proxy transforms the second request into a syntax for reading the transactional data store and sends a transformed request to the transactional data store.

In one embodiment, the transactional model proxy transforms the second request into SQL statements.

In one embodiment, the transactional model proxy receives an address of the transactional data store and protocol information for accessing the transactional data store.

In one embodiment, the transactional model proxy receives model information describing the transactional data model in the transactional data store, the model information comprising particular tables to be accessed and fields of data records to be returned, and wherein the transactional model proxy uses the model information to transform the second request so that the transformed request includes said tables and fields.

In one embodiment, the transactional model proxy implements a service interface for communicating with a service interface of a transaction data store.

In one embodiment, the transactional model proxy comprises information for establishing a direct connection and access to the transactional data store.

In one embodiment, the change of the data record in the transactional data store is an insertion, deletion, or modification of the data.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that receives a query, and the controller stores information about the transfer of data between a transactional data store and an analytic data store. The transactional data store stores data as a plurality of data records, each data record comprising a plurality of data elements, and wherein each data record comprises a data element having a first monotonically changing value, the analytic data store receives a plurality of data records from the transactional data store at discrete time periods and stores the received plurality of data records using the analytic data model, and wherein each data record in the analytic data model is associated with a data transfer indicator representing a time period when the data record was received in the analytic data store, and the information stored in the controller associates a data transfer indicator value with a second monotonically changing value. The controller generates a first request for data and a second request for data based on the query, the first request comprising the data transfer indicator value and the second request comprising the second monotonically changing value. The first request is sent an analytic data store, wherein the first request retrieves data elements from the analytic data store based on the data transfer indicator value. The system further includes a transactional model proxy, the transactional model proxy sending the second request to a transactional model proxy, wherein the transactional model proxy receives the second request and reads data directly from the transactional data store, and wherein the second request causes the transactional model proxy to read data records from the transactional data store based on the second monotonically changing value.

The following detailed description and accompanying drawings provide a better understanding of the nature and advantages of the present invention.

DETAILED DESCRIPTION

Described herein are techniques for performing direct reporting access to transactional data stores. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
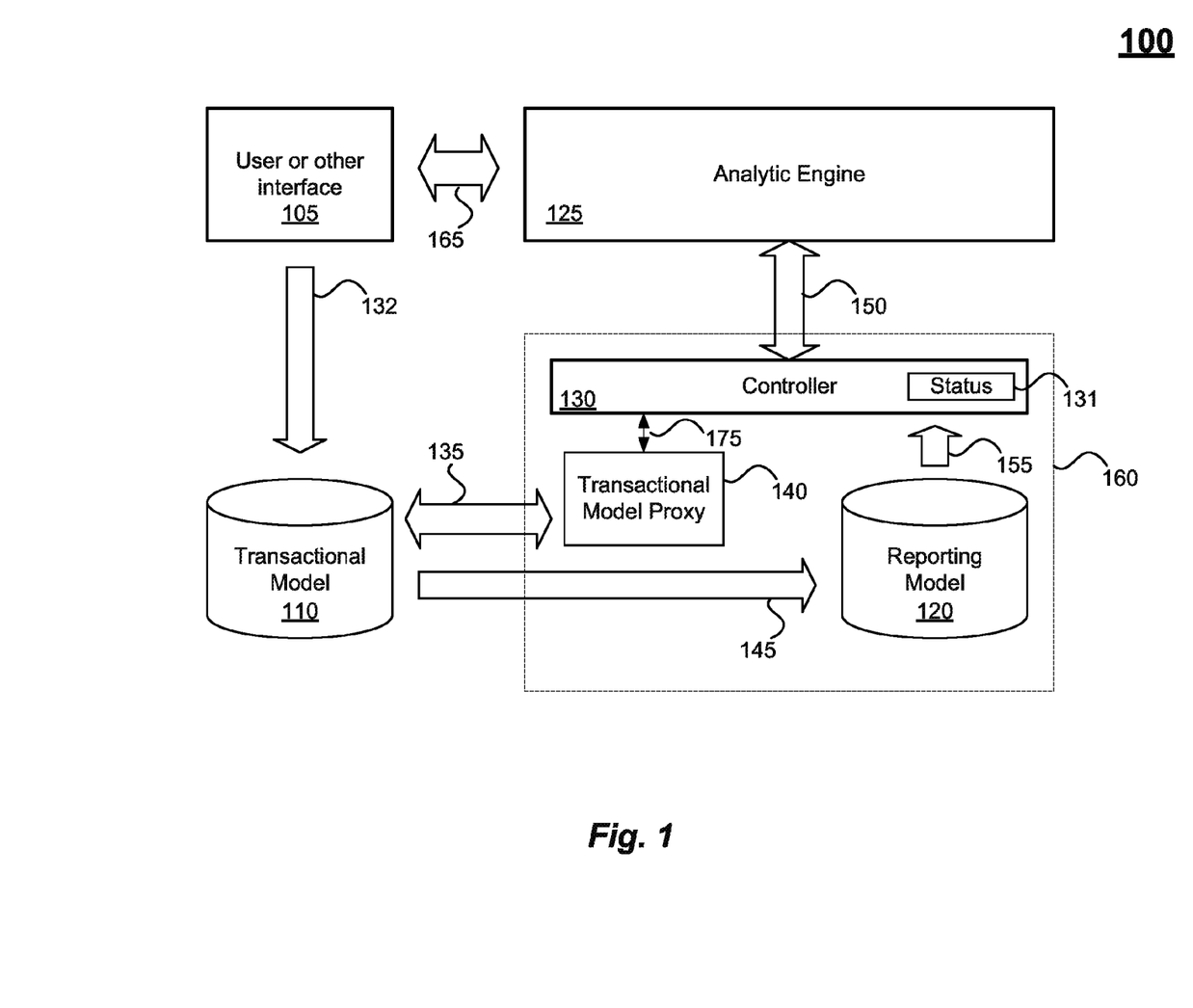
FIG. 1 is a schematic representation of a system for direct reporting access to transactional data according to an embodiment of the present invention.

FIG. 1 is a schematic representation of a system for direct reporting access to transactional data according to an embodiment of the present invention. System 100 includes a user or other interface 105, a transactional data store including a transactional model (i.e., a transactional model data store 110), an analytic data store including a reporting model (i.e., a reporting model data store 120), an analytic engine 125, a controller 130, and a transactional model proxy 140. In the following description, the term analytic data store is used interchangeably with reporting model data store and the term transactional data store is used interchangeably with transactional model data store. An example of a transactional data store may include a transactional database or an application storing transactional data. An example of an analytic data store may include an analytic database, such as a data warehouse. Information is conveyed between interface 105, data stores 110 and 120, and analytic engine 125 along data flow paths 132, 135, 145, 150, 155, 165 and 175. For example, analytic engine 125 accesses the contents of both transactional model data store 110 and reporting model data store 120 through controller 130 and transactional model proxy 140 over data flow path 150 when running queries. Such queries can yield an aggregated result set that accurately reflects the contents of both transactional model data store 110 and reporting model data store 120. Accordingly, controller 130, transactional model proxy 140, and reporting model data store 120 can thus together act as a hybrid data provider system 160.

User or other interface 105 is a collection of one or more data input/output devices for interacting with a human user or with another data processing system to receive and output data. For example, interface 105 can be a presentation system, one or more software applications, or a data communications gateway, for example. Data flow path 132 is data input received over interface 105 that causes a change to data stored in one or more transactional data models in transactional model data store 110. Such changes include the insertion, deletion, or modification of all or a portion of the contents of one or more transactional model data stores. Data output over interface 105 can present the results of data processing activities in system 100. For example, data flow path 165 can convey the results of queries or other operations performed on hybrid data provider 160 for presentation on a monitor or a data communications gateway.

Transactional model data store 110 is a collection of information that is stored at one or more data machine readable storage devices (e.g., data stores). Transactional model data store 110 may be a single transactional data store or multiple transactional data stores, which may be coupled to one or more software applications for storing application data. Transactional systems including transactional data stores may include combinations of hardware and software, such as application servers used to run financial applications, a human resources application, an ERP application, a CRM application, or the like. Transactional model data store 110 stores this information in one or more transactional models. Transactional data stores, such as transactional model data store 110, store data as a plurality of data records. Each data record comprises a plurality of data elements (e.g., fields of a record). Additionally, embodiments of the present invention include transactional data stores where each data record comprises a data element having a monotonically changing value, such as a timestamp, for example, indicating a time when the data record was changed in the transactional data store. Transactional model data store 110 may include different structures and their relations (e.g., data store tables, data records, fields (data elements in the records), and foreign key relations. Additionally, different structures and fields may include data types, descriptions, or other metadata, for example, which may be different for different transactional models. Data flow paths 135 and 145 convey information describing changes to data stored in a transactional model data store 110 to transactional model proxy 140 and reporting model data store 110. Such changes include the insertion, deletion, and modification of all or a portion of the contents of one or more transactional model data stores.

Reporting model data store 120 is a collection of information that is stored at one or more data storage devices. Reporting model data store 110 may be a single analytic data store or multiple analytic data stores or a data warehouse, for example. The stored information can characterize at least some of the information stored in transactional model data store 110. Reporting model data store 120 can store this information in one or more reporting data models, such as a star schema, for example. As mentioned above, one example of a reporting model data store 120 is a data warehouse, which may be implemented in hardware or software or as a customized combination of hardware and software. Data may be transferred from the transactional model data store 110 to the reporting model data store 120 in batches as illustrated by arrow 145. For example, arrow 145 may represent an extraction, transformation, loading (ETL) software system (not shown) that may connect to the transactional model data store 110 at discrete time periods and extract data records from the transactional data store, transform the data into a form used by the analytic model data store, and load the transformed data records into reporting model data store 120. The data records from the transactional model data store 110 are transformed such that they can be stored in a particular reporting data model used by a particular analytic data store. Execution of a particular ETL process is typically referred to as a "job", and the data that is loaded into an analytic data store during a particular job is sometimes referred to as a "batch". As each data record is stored in reporting model data store 120, each data record is typically associated with a data transfer indicator representing a time period when the data record was received in the analytic data store. For example, each batch of data may be assigned a data transfer indicator having a particular numeric value, and the value may increment as new batches are loaded. In this example, the numeric value represents a batch or job that occurred across some particular time period. Thus, a data transfer indicator may be a number, such as a batch or job number, for example (or another monotonically changing designation), which is associated with each data record and which may be used to distinguish when each particular data record was loaded into the analytic data store.

Data flow path 150 allows analytic engine 125 to access the data in transactional model data store 110 and reporting model data store 120. Analytic engine 125 is a collection of data processing activities (e.g., one or more data analysis programs or methods) performed in accordance with the logic of a set of machine-readable instructions. The data processing activities can include running queries on the contents of both transactional model data store 110 and reporting model data store 120. The results of such queries can be aggregated to yield an aggregated result set. A query is a request for information. A result set is a set of information that answers a query. An aggregated result set is a set of information from two or more data stores that answers a query, such as from transactional model data store 110 and reporting model data store 120. The set of information in an aggregated result set can be, for example, a union of the results of independent queries on the two or more data stores. The aggregated result sets can be conveyed to interface 105 over data flow path 165. Interface 105 can, in turn, render the aggregated result sets over an output device for a human or other user or to other systems. This output of aggregated result sets drawn from hybrid data provider 160, based on data from both transactional model data store 110 and reporting model data store 120, allows system 100 to accurately portray the contents of different data stores having different data models.

In some applications, embodiments of the present invention may be used to directly access data in transactional systems and analytic systems. Accordingly, an application server on one system and a data warehouse on another system may be queried by an analytic engine to provide up-to-date reports without the latencies typical in existing systems.

Queries from the analytic engine 125 may be received by controller 130. Controller 130 may be a component on the same system as a data warehouse or part of a different system and may be implemented in hardware, software, or as a combination of hardware and software, for example. Controller 130 receives a query from analytic engine 125 and generates two requests based on the received query. In the example shown in FIG. 1, controller 130 generates a first request for the reporting model data store 120 and generates a second request for the transactional model data store 110. Controller 130 stores status information 131 that associates a data transfer indicator value with another monotonically changing value (e.g., a job or batch number and a timestamp the job or batch number occurred). If a timestamp is used, the timestamp specifies a particular time period that data records in the analytic data store were received in the analytic data store. Because each data record in the analytic data store has a data transfer indicator value associated with it (e.g., a batch or job number as described above), the data transfer indicator value in each data record in the analytic data store can be linked to a particular timestamp stored in the controller's status information to determine when the data record was loaded. Conversely, querying the analytic data store using the data transfer indicators (and optionally other criteria) may be used to access data that was loaded at particular time periods. For example, if a data transfer indicator value of 5 is associated with a timestamp of 1/1/2010 12:00:00, then a query of the analytic data store for data records having data transfer indicator values that are less than or equal to 5 will return all data records loaded into the analytic data store before 1/1/2010 12:00:00. Accordingly, embodiments of the present invention may include, in the first request, a data transfer indicator value from the controller's status information. The first request is sent to the analytic data store to retrieve data records from the analytic data store based on the data transfer indicator value, which corresponds to the time period such data records were loaded. The first request may be used to retrieve data records from the analytic data store having a data transfer indicator value across a variety of ranges (e.g., greater than, less than, greater than or equal to, less than or equal to, or between specified values) depending on the specific implementation of the system.

Similarly, controller 130 embeds a timestamp (or other monotonically changing value) in the second request. For instance, controller 130 may access the status information so that the second request includes the timestamp associated with the data transfer indicator value used in the first request. The second request is sent to transactional model proxy 140. Transactional model proxy 140 receives the second request and reads data directly from the transactional data store. Because the second request includes a timestamp, the second request causes the transactional model proxy to read data records from the transactional data store based on the second timestamp. In other embodiments, another monotonically changing value other than a timestamp may be used to achieve the same result.

In one example implementation, transactional model proxy 140 may receive the request from controller 130 and transform the request into a syntax for reading the transactional data store. Further, in one embodiment, transactional model proxy may receive and store information for accessing the transactional data store, including an address, protocol information (e.g., http, RFC), login information, or encryption information, for example. The transactional data store, and the transactional model used for storing data in the transactional data store, may require information to allow transactional model proxy 140 to establish a direct connection and direct read of data. For example, transactional model proxy 140 may further receive and store model information describing the transactional data model. Model information may include information about specific tables to be accessed and fields of data records to be returned, for example. Transactional model proxy 140 may use the model information to transform the second request so that the transformed request includes specific tables and fields. As an example, transactional model proxy 140 may use the model information to transform the request from controller 130 into a SQL query syntax compatible with a target transactional data store, and the SQL query may specify specific tables and fields to be read from the data store. In some embodiments, transactional data stores may be accessible through web service interfaces. Accordingly, transactional model proxy 140 may implement a service interface for communicating with a web service interface of a transaction data store.

Controller 130 receives data from reporting model data store 120 in response to the first request. As data is received from the direct access of the transactional system by the transactional model proxy, the data may be transformed similarly the transformations performed by the ETL process to make the data from the transactional system compatible with data from the analytic system. Controller 130 receives data from the transactional model data store 110 through transactional model proxy 140 in response to the second request. In responding to the query from analytic engine 125, controller 130 may aggregate the data from transactional model data store 110 and reporting model data store 120. The aggregation may be implemented with a union operation, for example. Finally, controller 130 returns the aggregated data to analytic engine 125 in response to the query.

The status information in the controller may be updated when a batch load process has finished, for example. Accordingly, even during batch loading, no record is taken into account twice. Specifically, during loading the state of the data in the reporting model may be unknown. By committing the status information to the controller when the load process has finished, the data currently in the upload process is not inadvertently read twice from both the transactional and analytic systems because the analytic data store is read with a filter on the data transfer indicator, and the data, which is not committed to the reporting model, is read from the transactional system and not from the analytic system.

Figure 2:
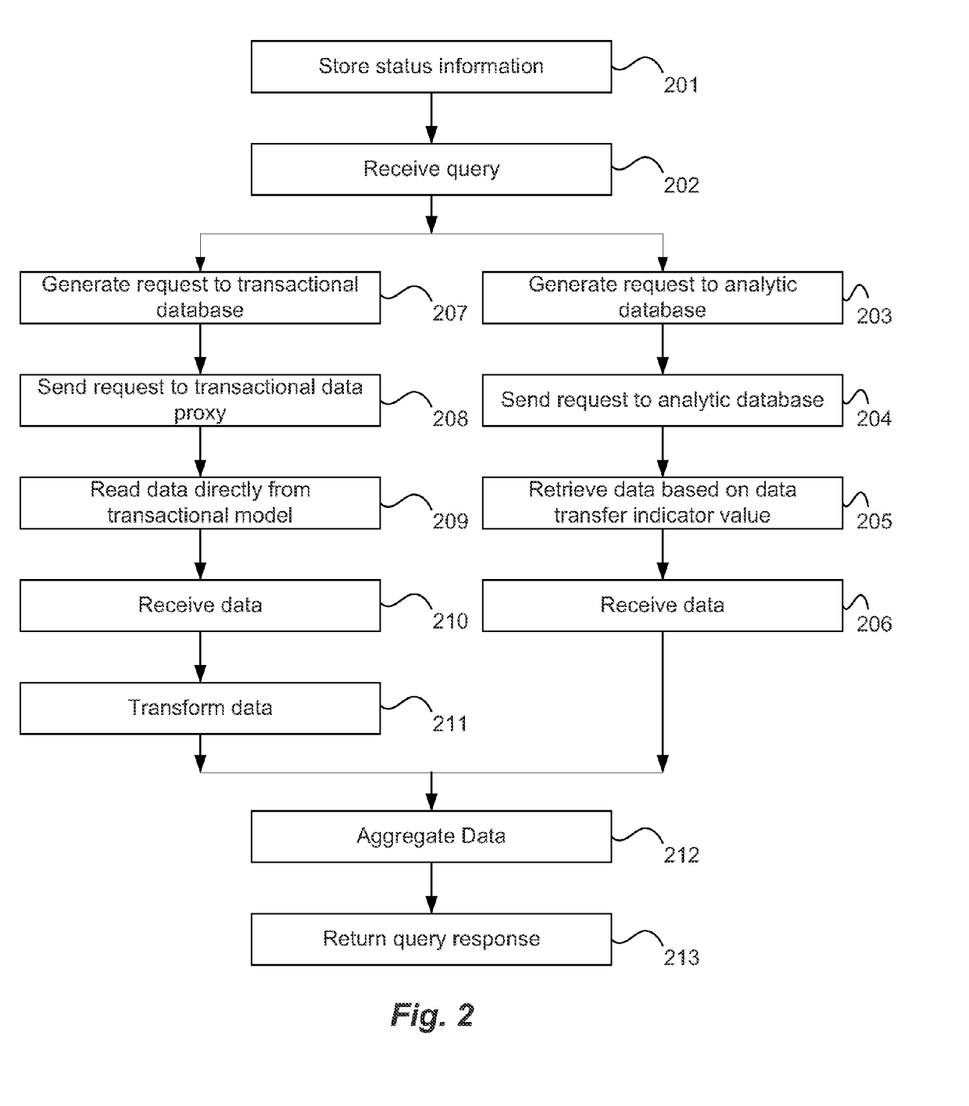
FIG. 2 illustrates a process for direct reporting access to transactional data according to an embodiment of the present invention.
Figure 3:
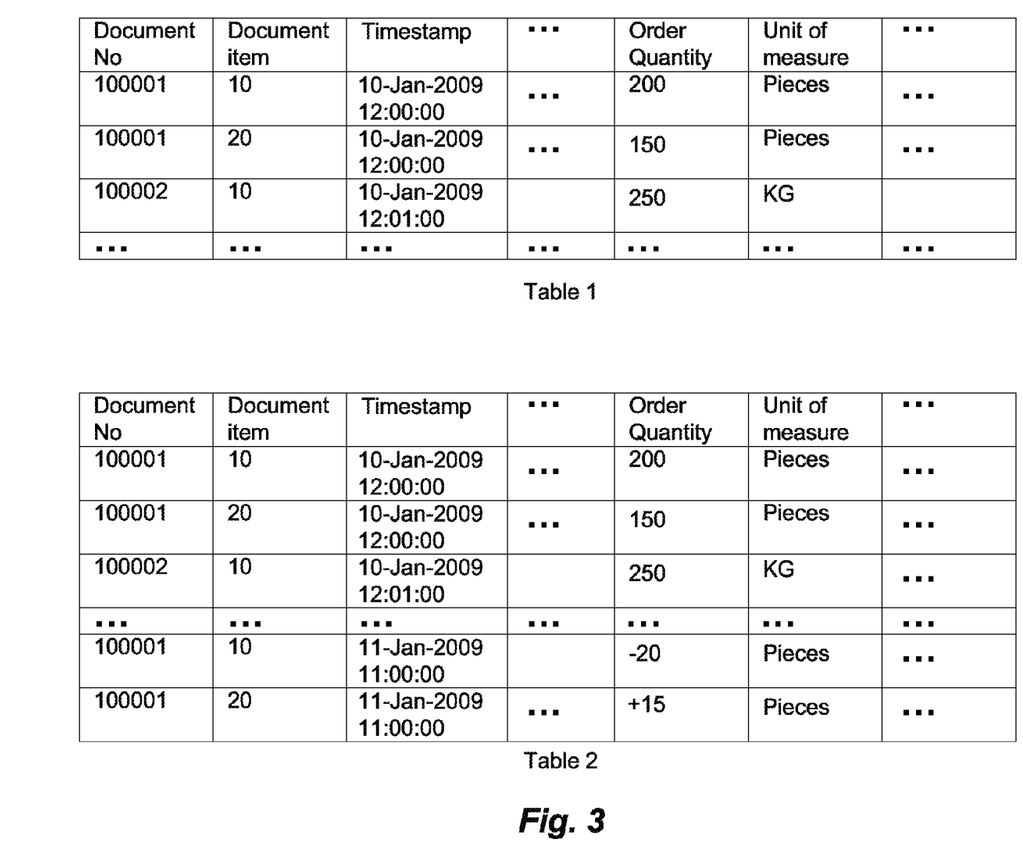
FIG. 3 illustrates example table values for a transactional data store.

FIG. 2 illustrates a process for direct reporting access to transactional data according to an embodiment of the present invention. The process illustrated in FIG. 2 will be described using the example values illustrated in FIGS. 3-5, which are example table values for a transactional data store, analytic data store, and status information. In the following example, the transactional model supports "inserts" into the storage of the transactional model. If a data record should be changed, a data record representing a difference between the new version and the old version is inserted in the table. Additionally, each data record includes a value which is increases monotonically over time. For example, if a data record is inserted, the numeric value may be higher than the numeric values in other previously inserted records. Table 1 in FIG. 3 is an example of table values before a data record is changed at time To. In this example, a timestamp is the monotonically changing value (increasing over time). Table 2 in FIG. 3 is an example of table values after the "Order Quantity" in two data records in Table 1 have been changed at a time $T_2>T_o$. Accordingly, two new data records recording the difference in "Order Quantity" have been inserted and timestamped 11-Jan-2009 11:00:00.

Figure 4:
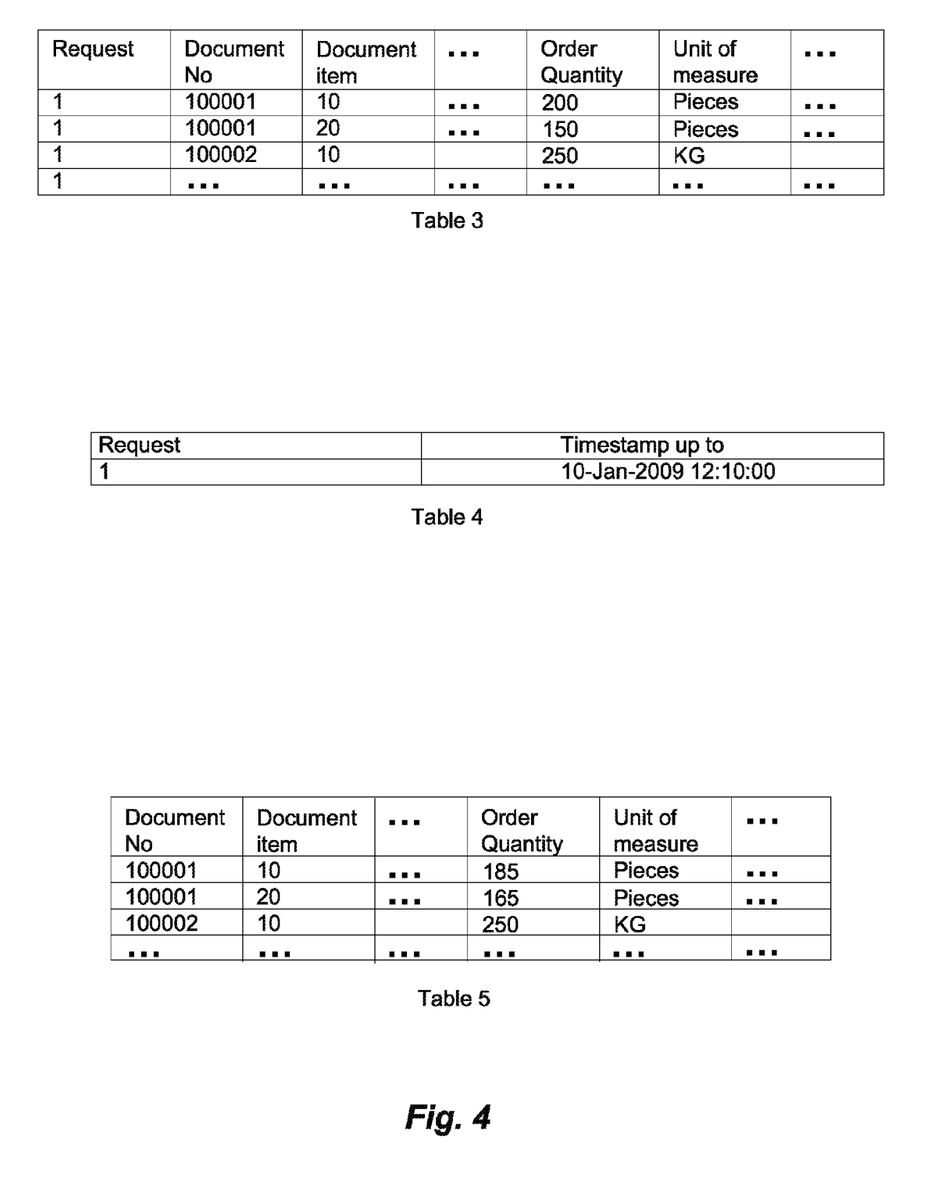
FIG. 4 illustrates example table values for an analytic data store, status information, and example query results.
Figure 5:
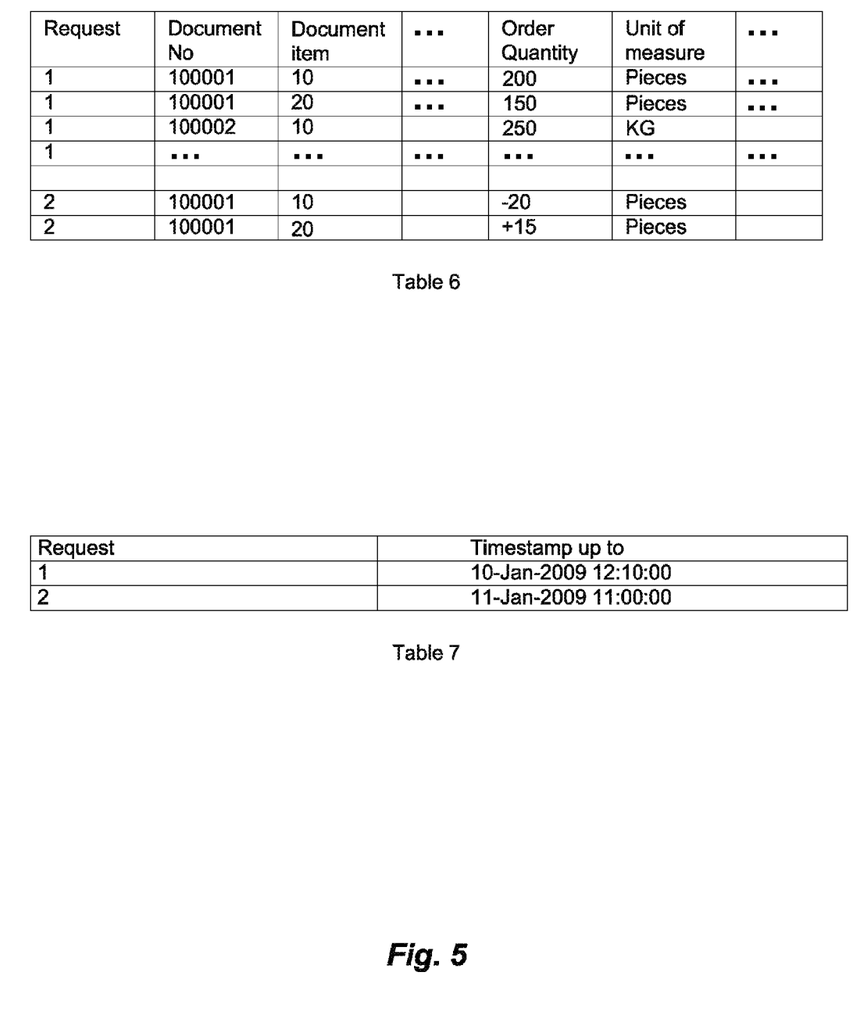
FIG. 5 illustrates example table values for an analytic data store and status information after a data upload.

In this example, the last job which uploaded the data from the transactional model to the reporting model happened at a time $T_1$ with $T_0<T_1<T_2$. The last job extracted all data with Timestamp <="10-Jan-2009 12:10:00". Table 3 in FIG. 4 shows the data in the target analytic data store at time $T_2$. When transferring data from the transactional model into the reporting model, every package of data gets a data transfer indicator number which is stored per record in the reporting model. This number has to be greater than the number of all previously loaded jobs. In this example, the "Request" field is the data transfer indicator field, which is the number of the package or batch (e.g., all the data records shown in Table 3 have the same data transfer indicator because they were all transferred to the analytic data store on the same batch).

Therefore, for the example scenario outlined above, the controller's status information is as shown in Table 4 of FIG. 4, which includes one data transfer indicator value associated with one timestamp for the extracted job.

Referring again to FIG. 2, status information is stored at 201 in controller 130. The status information here is a table (Table 4) associating a data transfer indicator value ('1') with a timestamp ('10-Jan-2009 12:10:00), for example. At 202, a query is received from an analytic engine. In response to the query, two requests are generated. At 203, a request is generated for an analytic data store. The request includes a data transfer indicator value (e.g., '1'). At 204, the request is sent to the analytic data store. At 205, data is retrieved from the analytic data store based on the data transfer indicator value. For example, the data records in Table 3 having a "Request" field value that is less than or equal to one (1) are retrieved. At 206, the data from the analytic data store is received in the controller.

Similarly, at 207, a request is generated for a transactional model proxy, and at 208 the request is sent to the transactional model proxy. This request includes the status information timestamp (e.g., '10-Jan-2009 12:10:00) so that the transactional model proxy only reads data records having timestamp field values greater than the status information timestamp value in the request. In other words, by only retrieving transactional data records from the transactional data store that have timestamp field values that are greater than (e.g., after) the timestamp value from the controller's status information (which is based on the last time transactional data was transferred to the analytic data store), the system is only reading data from the transactional data store that was added after the last batch transfer of data to the analytic data store. This limits direct data access of the transactional data store to new data added or changed after the last batch transfer between transactional and analytic systems. It is to be understood that other monotonically changing values could be used to obtain the same result.

As described above, the transactional model proxy may transform the request to be compatible with the transactional data store for direct read access. At 209, the data is read directly from the transactional data store, and at 210 the data is received (e.g., back in the controller). As mentioned above, as data is migrated from transactional model data store 110 to analytic model data store 120, it is typically transformed (e.g., as part of the ETL process). Accordingly, data read directly by the transactional model proxy may be similarly transformed to be compatible with data from the analytic system. At 211, the data from the analytic data store and the data from the transactional data store are aggregated into a single data set. In this example, the values read from the transactional data store are difference values (−20, +15), which may be added to the values in corresponding data records from the analytic data store. At 212, the aggregated data set is returned to the analytic engine in response to the query. Table 5 in FIG. 4 illustrates the resulting aggregated data set for this example. After the next batch transfer from the transactional data store to the analytic data store, the analytic data store contains the values shown in Table 6 in FIG. 5, and the controller's status information is shown in Table 7 in FIG. 5.

In one embodiment, controller 130 can be set into a state such that data is only read from the reporting model data store 120. The controller 130 may include a software function for disabling the second request to the transactional model proxy 140, for example. This may be useful for users who don't want to see the current state of the transaction model but only the state of the analytic system after the last batch uploaded from the transactional system, for example. Accordingly, users may turn direct access to the transactional data store on or off based on their particular needs.

Figure 6:
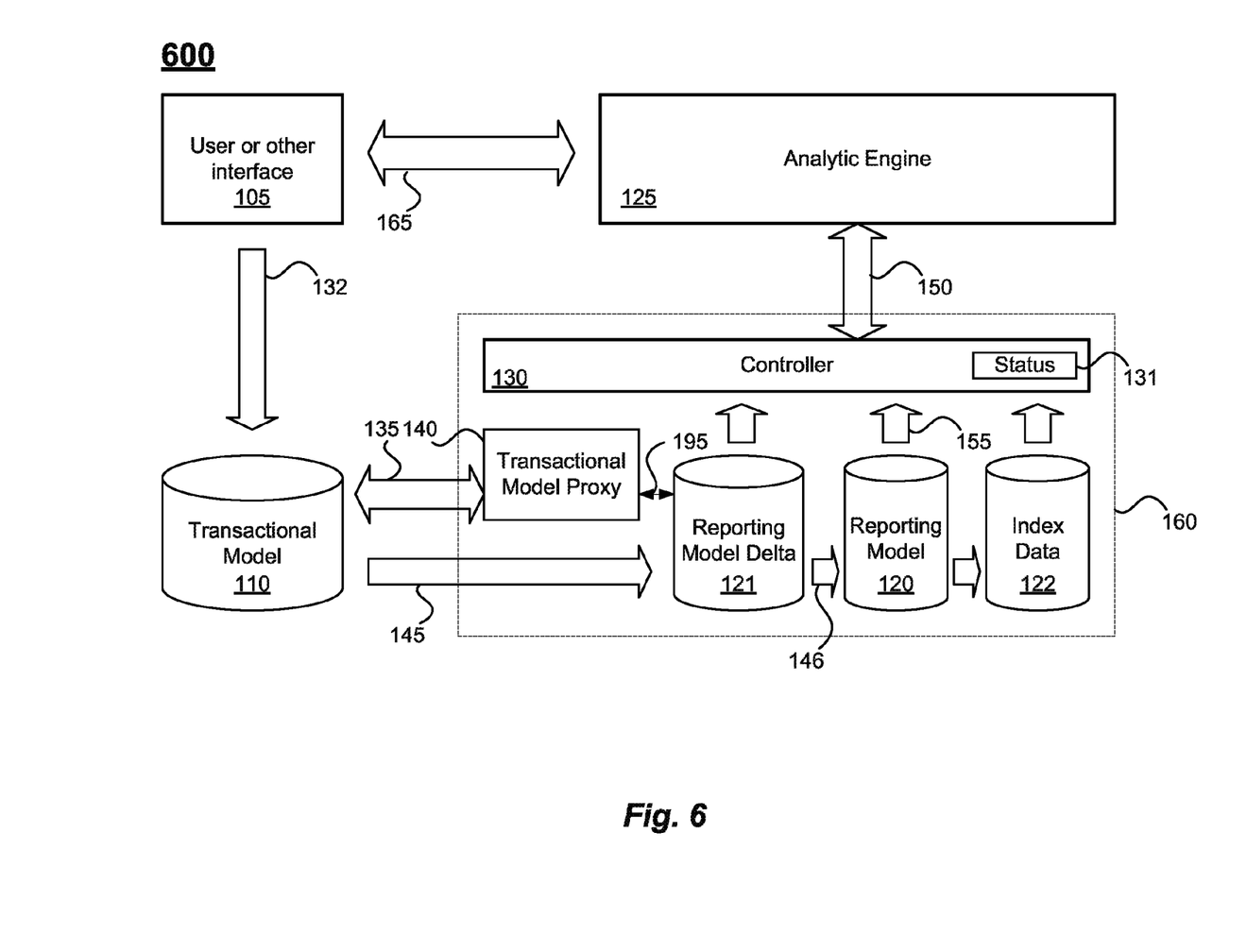
FIG. 6 is a schematic representation of a system for direct reporting access to transactional data according to another embodiment of the present invention.
Figure 7:
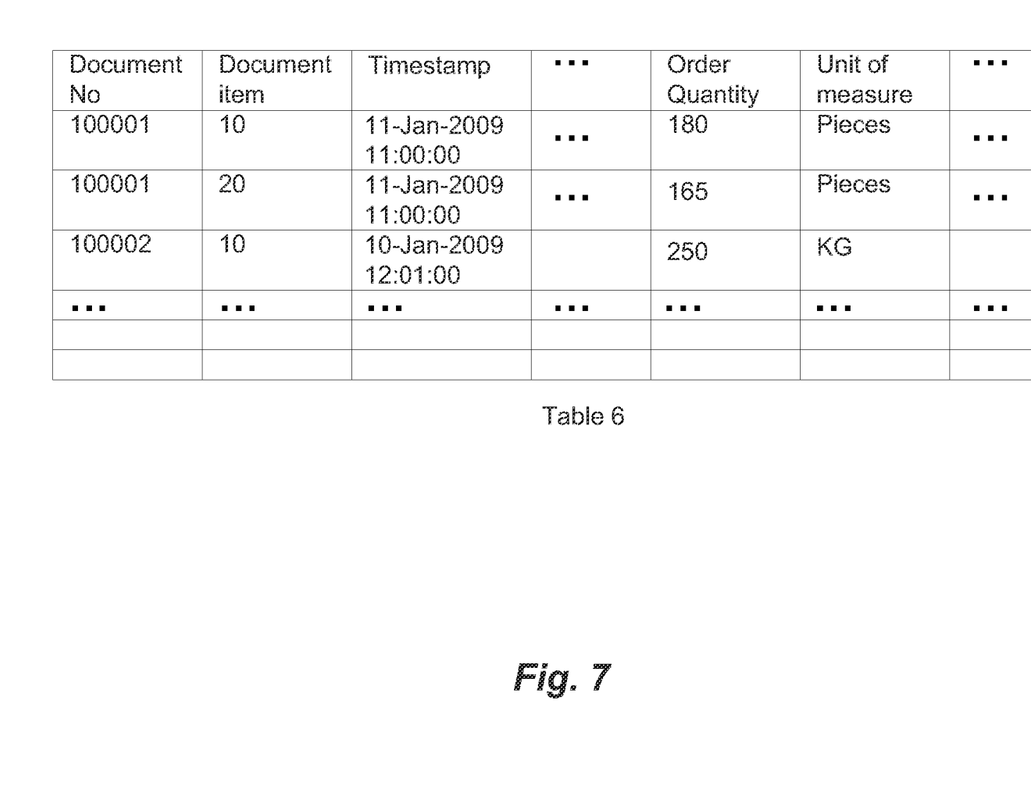
FIG. 7 illustrates example table values for another transactional data store.

FIG. 6 is a schematic representation of a system for direct reporting access to transactional data according to another embodiment of the present invention. Some transactional data stores may record changes to data values directly and not store difference values (additive deltas) as in the example shown in FIG. 3, Table 2. FIG. 6 shows another system that may be used to track difference values. System 600 is the same as system 100 of FIG. 1, except transactional data model store 110 records changes directly. An example of transactional data in transactional data model store 110 is shown in FIG. 7, Table 6, which corresponds to Table 2 in FIG. 3 at time $T_2>T_o$, except the changes are recorded directly and no difference value data records are inserted. In this example, controller 130 is coupled to a reporting model delta data store 121. Furthermore, the reporting model delta store 121 is coupled to the transactional data proxy 140. Reporting model delta data store 121 stores difference values (additive deltas) as data changes over time in transactional model data store 110. In this example, at time To after the last job uploaded the data from the transactional model data store 110, the data in the reporting model and reporting delta model is the same as in the example above as shown in FIG. 4, Table 3. The controller has the same status information as in FIG. 4, Table 4. In this example, when starting a query at time $T_2$ the controller 130 requests all data from the transactional model with "Timestamp">"10-Jan-2009 12:10:00". Data received by transactional model proxy 140 is passed to the reporting model delta 121. Next, the difference of the records read directly from the transactional data model store 110 to the records previously uploaded to the reporting model delta data store 121 is calculated. This provides the difference values. The result is combined with the data retrieved in response to the request to the reporting model data store 120 with "Request <=1" as described above, such that the same result set is obtained as shown in FIG. 4, Table 5.

Reporting model delta data store 121 is a collection of information that is stored at one or more data storage devices. The stored information can characterize changes to at least some of the content of one or more transactional model data stores 110. For example, reporting model delta data store 121 can receive multiple changes over data flow path 145 and accumulate them by storing them before conveying them to reporting model data store 120. Reporting model delta data store 121 can accumulate the changes in one or more different data models. For example, as discussed further below, reporting model delta data store 121 can accumulate the changes as additive delta records in one or more data tables. Data flow path 146 periodically conveys the accumulated changes to reporting model data store 120. Such conveyances can be periodic in that the conveyances are generally not continuous but rather reflect a number of discrete changes to transactional model data store 110. For example, several tens or even hundreds of such changes can be accumulated at reporting model delta data store 121 before their conveyance.

Embodiments of the present invention may further include an indexed data store 122. Indexed data store 122 is a collection of information that is stored at one or more data storage devices. Indexed data store 122 can store this information in one or more documents, data structures, data models, or other data storage devices (hereinafter "documents") that are indexed to an inverted index and searchable through the index. Indexed data store 122 can thus be searched, e.g., using fuzzy text searching, Boolean searching, attribute searching, linguistic searching, advanced text mining searches, and the like.

Additional information about the operation and use of reporting model delta data store 121 and index data store 122 can be found in U.S. Pat. No. 7,593,957, entitled Hybrid Data Provider, the entire disclosure of which is incorporated herein by reference.

Figure 8:
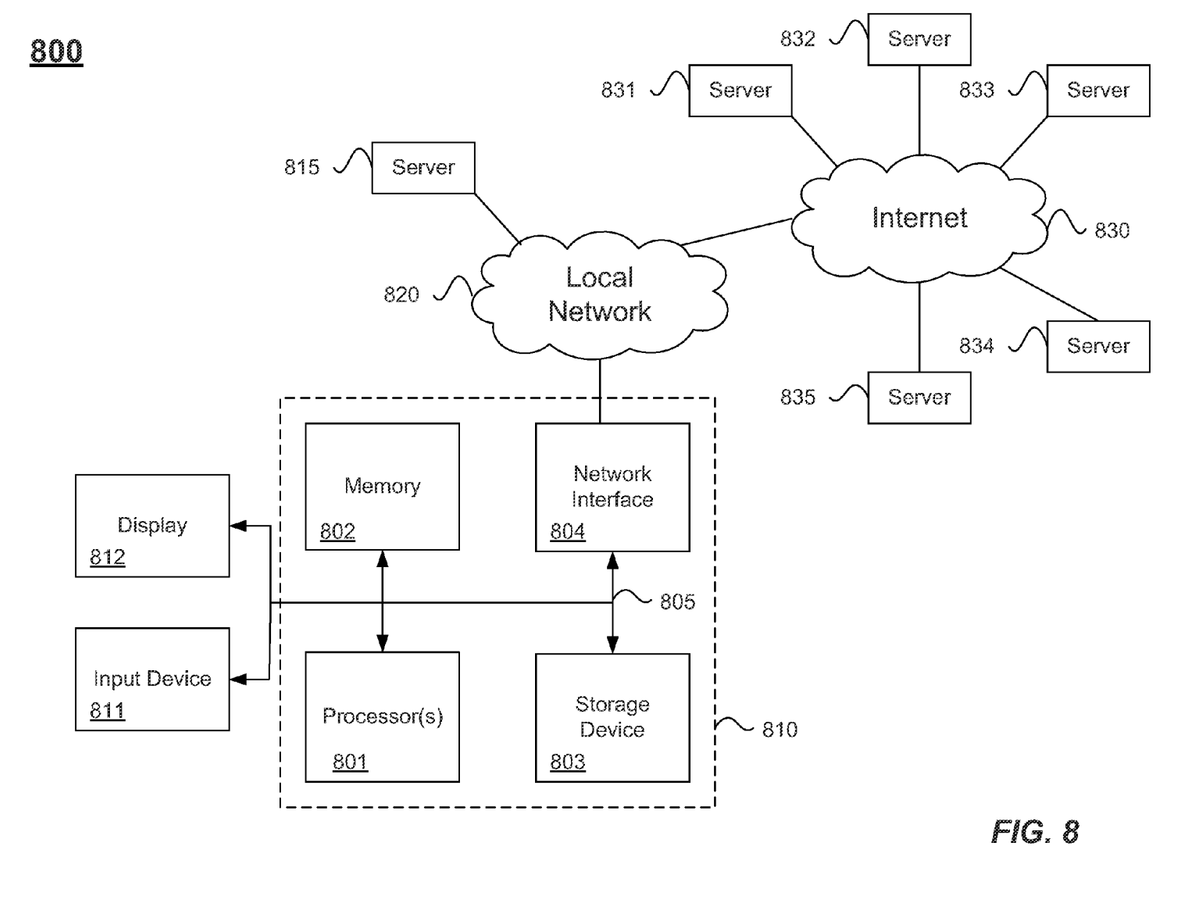
FIG. 8 illustrates hardware used to implement embodiments of the present invention.

FIG. 8 illustrates hardware used to implement embodiments of the present invention. An example computer system 810 is illustrated in FIG. 8. Computer system 810 includes a bus 805 or other communication mechanism for communicating information, and one or more processors 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A machine readable storage device 803 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device 803 and memory 802 are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820, for example. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may be programmed with processes described herein. In the Internet example, software components or services may reside on multiple different computer systems 810 or servers 831-835 across the network. Some or all of the processes described above may be implemented on one or more servers, for example. Specifically, the transactional model and the reporting model might be located on different computer systems 810, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

receiving a query at a computer comprising a controller and a memory coupled to the controller;

using the controller to store status information in the memory, wherein the status information includes information about transfers of data between a transactional data store and an analytic data store, wherein the transactional data store stores data as a plurality of data records using a transactional data model, each data record comprises a data element having a first monotonically changing value, wherein the first monotonically changing value indicates when the data record changed in the transactional data store, wherein the analytic data store receives a plurality of data records from the transactional data store at discrete time periods and stores the received plurality of data records using an analytic data model, and wherein each data record in the analytic data model is associated with a data transfer indicator representing a time period when the data record was received in the analytic data store, and wherein the status information stored in the memory associates a data transfer indicator value with a second monotonically changing value;

generating, using the controller, a first request for data based on the query, and comprising the data transfer indicator value;

generating, using the controller, a second request for data, based on the query, comprising the second monotonically changing value associated with the data transfer indicator value;

sending, from the controller, the first request to the analytic data store, receiving, at the controller, data records from the analytic data store in response to the data transfer indicator value; and retrieving, using the controller, data records directly from the transactional data store based on the second monotonically changing value in the second request for data;

wherein the second monotonically changing value is filtered from the first monotonically changing value based on a filter on the data transfer indicator in the status information, thereby causing the controller to read data that has not yet been transferred from the transactional data store to the analytical data store directly from the transactional data store in a manner to avoid inadvertently reading data twice.

2. The method of claim 1 wherein the first monotonically changing value is a timestamp indicating a time when the data record was changed in the transactional data store and wherein the second monotonically changing value is a timestamp specifying a particular time period that one or more data records associated with a particular data transfer indicator were received in the analytic data store.

3. The method of claim 1 wherein the first request retrieves data records from the analytic data store having said data transfer indicator value in a first range.

4. The method of claim 3 wherein the data transfer indicator value of the retrieved data records is a number less than or equal to the data transfer indicator value in the first request.

5. The method of claim 1 further comprising:
receiving, at the controller, first data from the analytic data store in response to the first request; and
receiving, at the controller, second data from the transactional data store in response to the second request;
using the controller to aggregate the first data and the second data; and
sending the aggregated data from the controller in response to the query.

6. The method of claim 1 wherein the data transfer indicator specifies one of a plurality of batch loadings of data from the transactional data store to the analytic data store.

7. The method of claim 1 wherein, in response to the second request, the controller retrieves data records from the transactional data store having said first monotonically changing value greater than said second monotonically changing value.

8. The method of claim 1 wherein the controller transforms the second request into a syntax for reading the transactional data store and sends a transformed request to the transactional data store.

9. The method of claim 8 wherein the controller transforms the second request into SQL statements.

10. The method of claim 8 wherein the controller receives an address of the transactional data store and protocol information for accessing the transactional data store.

11. The method of claim 8 wherein the controller receives model information describing the transactional data model in the transactional data store, the model information comprising particular tables to be accessed and fields of data records to be returned, and wherein the controller uses the model information to transform the second request so that the transformed request includes said tables and fields.

12. The method of claim 8 wherein the controller implements a service interface for communicating with a service interface of a transaction data store.

13. The method of claim 1 wherein the controller comprises information for establishing a direct connection and access to the transactional data store.

14. The method of claim 1 wherein the change of the data record in the transactional data store is an insertion, deletion, or modification of the data.

15. A non-transitory computer readable medium embodying a computer program for performing a method, said method comprising:
receiving a query in a controller, wherein the controller stores status information, wherein the status information includes information about the transfer of data between a transactional data store and an analytic data store,
wherein the transactional data store stores data as a plurality of data records using a transactional data model, each data record comprises a data element having a first monotonically changing value, wherein each of the first monotonically changing values indicates when the data record changed in the transactional data store,
wherein the analytic data store receives a plurality of data records from the transactional data store at discrete time periods and stores the received plurality of data records using the analytic data model, and wherein each data record in the analytic data model is associated with a data transfer indicator representing a time period when the data record was received in the analytic data store, and
wherein the status information stored in the controller associates a data transfer indicator value with a second monotonically changing value;
generating, by the controller, a first request for data and a second request for data based on the query, the first request comprising the data transfer indicator value and the second request comprising the second monotonically changing value associated with the data transfer indicator value;
sending the first request to the analytic data store, wherein the first request retrieves data records from the analytic data store based on the data transfer indicator value; and
sending the second request to a transactional model proxy, wherein the transactional model proxy receives the second request and reads data directly from the transactional data store, and wherein the second request causes the transactional model proxy to read data records from the transactional data store based on the second monotonically changing value;
wherein the second monotonically changing value is filtered from the first monotonically changing value based on a filter on the data transfer indicator in the status information, thereby causing the controller to read data that has not yet been transferred from the transactional data store to the analytical data store directly from the transactional data store in a manner to avoid inadvertently reading data twice.

16. The non-transitory computer readable medium of claim 15 wherein the second request retrieves data records from the transactional data store having said first monotonically changing value greater than said second monotonically changing value.

17. The non-transitory computer readable medium of claim 15 wherein the transactional model proxy transforms the second request into a syntax for reading the transactional data store and sends a transformed request to the transactional data store.

18. A computer system comprising:
one or more processors;
a controller, the controller receiving a query, wherein the controller stores status information, wherein the status information includes information about the transfer of data between a transactional data store and an analytic data store,
wherein the transactional data store stores data as a plurality of data records, each data record comprising a plurality of data elements, and wherein each data record comprises a data element having a first monotonically changing value, wherein each of the first monotonically changing values indicates when the data record changed in the transactional data store,
wherein the analytic data store receives a plurality of data records from the transactional data store at discrete time periods and stores the received plurality of data records using the analytic data model, and wherein each data record in the analytic data model is associated with a data transfer indicator representing a time period when the data record was received in the analytic data store, and wherein the status information stored in the controller associates a data transfer indicator value with a second monotonically changing value;

the controller generating a first request for data and a second request for data based on the query, the first request comprising the data transfer indicator value and the second request comprising the second monotonically changing value, and the controller sending the first request to the analytic data store, wherein the first request retrieves data elements from the analytic data store based on the data transfer indicator value; and a transactional model proxy, the transactional model proxy sending the second request to a transactional model proxy, wherein the transactional model proxy receives the second request and reads data directly from the transactional data store, and wherein the second request causes the transactional model proxy to read data records from the transactional data store based on the second monotonically changing value;

wherein the second monotonically changing value is filtered from the first monotonically changing value based on a filter on the data transfer indicator in the status information, thereby causing the controller to read data that has not yet been transferred from the transactional data store to the analytical data store directly from the transactional data store in a manner to avoid inadvertently reading data twice.

19. The computer system of claim 18 wherein the second request retrieves data records from the transactional data store having said first monotonically changing value greater than said second monotonically changing value.

20. The computer system of claim 18 wherein the transactional model proxy transforms the second request into a syntax for reading the transactional data store and sends a transformed request to the transactional data store.

* * * * *